3,761,422
PHOTOCHROMIC PLASTISOL COMPOSITIONS, METHOD OF PRODUCING PHOTOCHROMIC POLYVINYL CHLORIDE FILMS THEREFROM AND THE RESULTANT FILMS
Philip Silver, Brooklyn, N.Y., assignor to Nuclear Research Associates, Inc., New Hyde Park, N.Y.
No Drawing. Filed Jan. 31, 1972, Ser. No. 222,364
Int. Cl. G02b 5/20, 9/02
U.S. Cl. 252—300                    21 Claims

ABSTRACT OF THE DISCLOSURE

A photochromic plastisol composition consisting essentially of: 35% to 80% by weight of an essentially pure polyvinyl chloride resin containing less than 2.5% by weight of methanol extractables and less than 1% by weight of volatile constituents; 32 to 60% by weight of at least one of dioctyl phthalate and tricresyl phosphate; 0.7 to 1.6% by weight of tin maleate; and 0.02 to 0.2% by weight of at least one of mercuric, zinc or lead bis-diphenylthiocarbazone. These compositions may be formed into films.

This invention relates to photochromic compositions, and more particularly to compositions containing mercuric, zinc or lead bis-diphenylthiocarbazone or mixtures of any two or all thereof as the essential photochromic component in plastisols which are basically physical mixtures of vinyl resins and compatible plasticizers. The shorter and equivalent terminology "dithizonate" may be used instead of "diphenylthiocarbazone."

Mercuric, zinc and lead bis-dithizonate have been previously proposed as photochromic compounds with good photochromic reaction rates, and good resistance to deterioration under prolonged light exposure and repeated lighting cycles. However, these compounds have been found to have a photochromic reversion rate (reaction rate of return to the initial state with decreasing light intensity) in plastisols which are too rapid and in some instances so rapid that the change is not detectable by the human eye, thereby rendering the photochromic compound impractical in applications which utilize plastisols.

It is an object of this invention to provide a photochromic plastisol composition which will not be subject to the above disadvantages. A further object of the invention is the provision of such a composition containing mercuric, zinc or lead bis-dithizonate as the essential photochromic component. Other objects and advantages of the invention will become apparent from the following description.

The achievement of the above objects is made possible by this invention according to which a composition is provided comprising at least one of photochromic mercuric, zinc or lead bis-dithizonate, and, for controlling the photochromic reaction rate of said mercuric, zinc or lead compound, the proper type of resin, plasticizer, secondary plasticizer, stabilizer, and in certain cases, at least one carboxy-containing organic compound.

It has been found that various vinyl resins dispersed in like plasticizer systems containing the mercuric, zinc or lead bis-dithizonate have different reaction rates. In some resin-plasticizer systems the reversion rates were so fast that the photochromic change seemed negligible in response to changes in intensity of the light or electromagnetic waves (visible or ultraviolet (UV)). The plasticizers in these systems are the citrates, adipates, azelates and epoxy derivatives. In contrast to reversion rates which are so fast as to make the photochromic change negligible, compositions can be provided according to the invention as described in greater detail below. All proportions herein are by weight.

Certain vinyl resins contain residual surface active agents. Resins which are already in plastisol form compounded by the manufacturer have been found to be unsatisfactory due to the presence of one or more of the following substances: surface active agents which are added to lower the initial viscosity of the plastisol, volatile diluents which are used to decrease the viscosity and increase the ratio of yield value to viscosity, stabilizers of the lead, barium cadmium, chelator, zinc, or epoxy types, plasticizers and secondary plasticizers which may not be compatible with the photochromic material. Each one of the above mentioned components may act as either an inhibitor or a reversion accelerator for the photochromic material. In some cases, the vinyl system must be rendered opaque before a photocrhromic change is observable.

Therefore, the most desirable polyvinyl chloride resin prior to addition of other materials such as plasticizers, and so forth, must have the following requirements:

less than 2.5% by weight of methanol extractables; less than 1% by weight of volatiles; contain no barium cadmium, or barium cadmium zinc, or zinc, or epoxy type stabilizers; contain no surface active agents, viscosity depressants, fillers or pigments.

The polyvinyl chloride resin employed in this invention will generally have an inherent viscosity in the range of about 0.40 to about 1.40 and preferably about 0.90 to about 1.24.

Below, Table I lists the additional ingredients tried and those that are preferred or required to make a satisfactory photochromic plastisol according to the invention.

TABLE I

| Generic type | Specific ingredients tried | Preferred or critical ingredients |
|---|---|---|
| 1. Primary plasticizer | Ethyl phthalyl ethyl glycolate | |
| | Adipic acid derivative | |
| | Azelaic acid derivatives, low temperaulre plasticizers. | |
| | Butyl benzyl phthalate | |
| | Chlorinated polyphenols | |
| | Epoxy type | |
| | Tributyl citrate | |
| | Dibutyl phthalate | |
| | Dioctyl phthalate | Dioctyl phthalate. |
| | Tricresyl phosphate | Tricresyl phosphate |
| | Tin maleate | Tin maleate. |

See footnotes at end of table.

TABLE I—Continued

| Generic type | Specific ingredients tried | Preferred or critical ingredients |
|---|---|---|
| 2............ Stabilizer............ | Tin mercaptide.................................... Barium cadmium zinc liquid [1].................. Bariu cadmiu zinc liquid [1] with an added air release compound. [2] | |
| 3............ Secondary plasticizer [3] | Conoco H 25 (branched chain alkylbenzene) [4]..... Conoco AB515 (branched chain dodecylbenzene). [5] | |
| 4............ Pigment [6] ............ | Titanium dioxide................................... | 67–75% titanium dioxide dispersed in dioctyl phthalate. |

[1] Mark KCB (trademark of Argus Chemical Co.); contains Ba, Cd and Zn salts of lower carboxylic acids, further information not published.
[2] Mark BB (trademark of Argus Chemical Co.); contains the salts mentioned in note 1 plus an organic air release compound; further information not published.
[3] Not required. Can be eliminated when difference is made up with primary plasticizer.
[4] Trademark of Continental Oil Co.; further information not published.
[5] Trademark of Continental Oil Co.; further information not published.
[6] Addition of pigment only if an opaque film is desired.

The primary plasticizers and stabilizers listed under "specific ingredients tried" but not under "preferred or critical ingredients" are those with which the pronounced photochromic effect sought in the present invention was not attained.

Table II illustrates compositions according to the invention giving the concentration range from each ingredient.

TABLE II

| Ingredient type | Broad range (percent by by weight) | Preferred range (percent by weight) |
|---|---|---|
| Resin.................................. | 35–80 | 40–55 |
| Primary plasticizer.................... | 32–60 | 38–55 |
| Secondary plasticizer.................. | 0–6 | |
| Stabilizer............................. | 0.7–0.6 | 0.7–1.6 |
| Pigment............................... | 1.2–8.0 | 1.2–2.5 |
| $Me^+ (DZ)_2$ [a]..................... | 0.02–0.2 | 0.09–0.15 |
| Reversion accelerator [b].............. | 0.5–2.0 | |

[a] Hg, Pb or Zn bis-diphenylthiocarbazone or mixture of any two or all three thereof.
[b] The addition of a reversion accelerator is required only if a fast controlled return time is desired. Exemplary reversion accelerators are meta-nitrobenzoic acid and oxalic acid.

Fusion temperature of the plastisol material is 170° C.–190° C. Actual heating time depends on the plasticizers used, the mass and the mold used. It is essential that the entire mass reach the fusion temperature. For example, at 170° C., a 30 mil film deposited, as by casting, for example, on a glass plate or other smooth substrate will fuse in 4 minutes. A thicker section will take longer under similar conditions. If the temperature is higher, fusion time will be less. Conversely, if the temperature is lower, fusion time will be longer. However, if the temperature is too low, fusion will not take place no matter how long a dwell time. After fusion, the film or sheet is permitted to cool and is then stripped from the substrate. Alternatively, the plastisol may be left on the substrate which, in that event, need not be smooth. Essentially, any solid surface, such as metal, glass, paper, cardboard, plastics, wood and so forth, may constitute the substrate. The term "film" as employed herein is not intended to have any strict connotation as to thickness and also is intended to be inclusive of layers of the composition supported on substrates as well as unsupported films, the latter of which may also be referred to as "sheets."

In the presence of sunlight or any bright light, such plastisol films or sheets automatically change to a darkened state. The degree of plastisol color change is a function of total energy absorbed. At maximum brightness the forward photochromic reaction rate (rate of darkening) is very fast. When the light level is reduced, the plastisols automatically revert to their original shade.

These photochromic plastisols can be made in various colors such as green, brown, tan, gray, and amber by appropriate addition to the plastisol composition of solvent-soluble non-photochromic dyes such as Sudan Yellow (Color Index No. Solvent Yellow 30), Sudan Green 4F (Color Index No. Solvent Green 30), Sudan Irisol (Color Index No. Solvent Violet 30) and Sudan Blue (no Color Index No.) (products of General Aniline & Flim Corporation) or other appropriate dyes in small amounts ranging for example from about 0.1–0.5 part per pert by weight of the bis-dithizonate compound.

Exemplary plastisol formulations according to the invention are as follows:

EXAMPLE 1

Percent by weight

| | |
|---|---|
| Tenneco 1775 (trademark of Eastman-Tennessee Co.; polyvinyl chloride, intrinsic viscosity=0.98) | 47.65 |
| Tricresyl phosphate | 47.65 |
| Conoco H25 | 2.55 |
| Mark 275 (trademark of Argus Chemical Co.; tin maleate) | 0.76 |
| $TiO_2$ dispersion (70% $TiO_2$ in dioctyl phthalate) | 1.30 |
| Mercuric dithizonate | 0.10 |

EXAMPLE 2

Percent by weight

| | |
|---|---|
| Tenneco 1755 | 46.97 |
| Tricresyl phosphate | 46.97 |
| Conoco H25 | 24.8 |
| Mark 275 | .74 |
| $TiO_2$ dispersion (70% $TiO_2$ in dioctyl phthalate) | 1.26 |
| Mercuric dithizonate | 0.10 |
| Meta-nitrobenzoic acid | 1.48 |

EXAMPLE 3

Percent by weight

| | |
|---|---|
| Tenneco 1755 | 48.06 |
| Dioctyl phthalate | 48.06 |
| Conoco H25 | 2.42 |
| Mark 275 | 0.73 |
| Mercuric dithizonate | 0.73 |

EXAMPLE 4

Percent by weight

| | |
|---|---|
| Geon 121 (trademark of B. F. Goodrich Chemical polyvinyl chloride, intrinsic viscosity=1.21) | 38.12 |
| Dioctyl phthalate | 57.20 |
| Mark 275 | 1.53 |
| $TiO_2$ dispersion (70% $TiO_2$ in dioctyl phthalate) | 1.53 |
| Mercuric dithizonate | 0.09 |
| Oxalic acid | 1.53 |

EXAMPLE 5

Percent by weight

| | |
|---|---|
| Tenneco 1755 | 47.46 |
| Dioctyl phthalate | 47.46 |
| Conoco H25 | 2.37 |
| Mark 275 | 0.72 |
| $TiO_2$ dispersion (70% $TiO_2$ in dioctyl phthalate) | 1.96 |
| Mercuric dithizonate | 0.012 |
| Sudan Green 4B | 0.008 |
| Sudan Blue CSP | 0.003 |
| Suran Irisol | 0.002 |

It will be understood that other substances may be included in the compositions of this invention such as viscosity depressants, antioxidants, fillers, inert diluents and the like which are compatible with the photochromic compound and which do not unduly increase the photochromic reversion rate.

Sheets cast of the photochromic plastisols of the invention are useful as toys and novelties and whenever it is desired to have a temporary two-dimension reproduction of the shape of an object or for displays in which the sheet is selectively exposed to light of sufficient intensity to cause the photochromic effect. For example, an object the shape of which it is desired to reproduce temporarily on the sheet is placed on the sheet in ordinary indoor lighting; with the object still on the sheet, the sheet is then held close to the light source whereupon all of the sheet but for the area covered by the object darkens; the sheet is then removed from proximity to the light source and the object is then removed from the sheet, leaving an area on the sheet of lighter color than the rest of the sheet which area is in the shape of the object or the projection of the object onto the plane of the sheet, the darkened portions of the sheet then returning to the lighter tone.

This invention has been disclosed with respect to certain preferred embodiments and it is to be understood that various modifications and variations thereof obvious to persons of ordinary skill in the art are to be included within the spirit and purview of this invention and application and the scope of the appended claims.

What is claimed is:

1. A photochromic plastisol composition consisting essentially of: 35 to 80% by weight of an essentially pure polyvinyl chloride resin containing less than 2.5% by weight of methanol extractables and less than 1% by weight of volatile constituents; 32 to 60% by weight of at least one of dioctyl phthalate and tricresyl phosphate; 0.7 to 1.6% by weight of tin maleate; and 0.02 to 0.2% by weight of at least one of mercuric, zinc or lead bis-diphenylthiocarbazone.

2. A composition according to claim 1, in which the proportions, by weight, are as follows: 40 to 55% resin; 38 to 55% of at least one of dioctyl phthalate and tricresyl phosphate; 0.7 to 1.6% tin maleate; and 0.09 to 0.15% of at least one of said bis-diphenylthiocarbazones.

3. A composition according to claim 1, further consisting of up to 6% by weight of a branched chain alkylbenzene in which the alkyl is 8 to 24 carbon atoms.

4. A composition according to claim 3, further consisting of 1.2 to 8.0% by weight of titanium dioxide.

5. A composition according to claim 4, in which the proportion of titanium dioxide is 1.2 to 2.5% by weight.

6. A composition according to claim 1, further consisting of 0.5 to 2.0% by weight of a reversion accelerator selected from the group consisting of meta-nitrobenzoic acid and oxalic acid.

7. A composition according to claim 1, further consisting of about 0.1 to about 0.5 part per part by weight of the bis-diphenylthiocarbazone of a non-photochromic dye.

8. A method of producing a photochromic polyvinyl chloride film comprising depositing the composition according to claim 1 as a film on a substrate, heating the film to a temperature of 170 to 190° C. until the entire film fuses, and allowing the film to cool.

9. A method of producing a photochromic polyvinyl chloride film comprising depositing the composition according to claim 2 as a film on a substrate, heating the film to a temperature of 170 to 190° C. until the entire film fuses, and allowing the film to cool.

10. A method of producing a photochromic polyvinyl chloride film comprising depositing the composition according to claim 3 as a film on a substrate, heating the film to a temperature of 170 to 190° C. until the entire film fuses, and allowing the film to cool.

11. A method of producing a photochromic polyvinyl chloride film comprising depositing the composition according to claim 4 as a film on a substrate, heating the film to a temperature of 170 to 190° C. until the entire film fuses, and allowing the film to cool.

12. A method of producing a photochromic polyvinyl chloride film comprising depositing the composition according to claim 5 as a film on a substrate, heating the film to a temperature of 170 to 190° C. until the entire film fuses, and allowing the film to cool.

13. A method of producing a photochromic polyvinyl chloride film comprising depositing the composition according to claim 6 as a film on a substrate, heating the film to a temperature of 170 to 190° C. until the entire film fuses, and allowing the film to cool.

14. A method of producing a photochromic polyvinyl chloride film comprising depositing the composition according to claim 7 as a film on a substrate, heating the film to a temperature of 170 to 190° C. until the entire film fuses, and allowing the film to cool.

15. A photochromic film consisting essentially of 35 to 80% by weight of an essentially pure polyvinyl chloride resin containing less than 2.5% by weight of methanol extractables and less than 1% by weight of volatile constituents; 32 to 60% by weight of at least one of dioctyl phthalate and tricresyl phosphate; 0.7 to 1.6% by weight of tin maleate; and 0.02 to 0.2% by weight of at least one of mercuric, zinc or lead bis-diphenylthiocarbazone.

16. A film according to claim 15, in which the proportions, by weight, are as follows: 40 to 55% resin; 38 to 55% of at least one of dioctyl phthalate and tricresyl phosphate; 0.7 to 1.6% tin maleate; and 0.09 to 0.15% of at least one of said bis-diphenylthiocarbazones.

17. A film according to claim 15, further consisting of up to 6% by weight of a branched chain alkylbenzene in which the alkyl is 8 to 24 carbon atoms.

18. A film according to claim 17, further consisting of 1.2 to 8.0% by weight of titanium dioxide.

19. A film according to claim 18, in which the proportion of titanium dioxide is 1.2 to 2.5% by weight.

20. A film according to claim 15, further consisting of 0.5 to 2.0% by weight of a reversion accelerator selected from the group consisting of meta-nitrobenzoic acid and oxalic acid.

21. A film according to claim 15, further consisting of about 0.1 to about 0.5 part per part by weight of the bis-diphenylthiocarbazone of a non-photochromic dye.

References Cited
UNITED STATES PATENTS

| | | | |
|---|---|---|---|
| 3,159,646 | 12/1964 | Milionis et al. | 252—300 |
| 3,176,043 | 3/1965 | Hoekseman | 252—300 |
| 3,429,732 | 2/1969 | Baitmger et al. | 252—300 |

NORMAN G. TORCHIN, Primary Examiner

J. P. BRAMMER, Assistant Examiner

U.S. Cl. X.R.

117—34, 161 UF; 350—160